No. 826,625. PATENTED JULY 24, 1906.
W. R. TEMPLETON.
VALVE.
APPLICATION FILED JUNE 16, 1905.

Witnesses.
Thomas J. Drummond.
S. Wm. Lutton.

Inventor.
William R. Templeton,
by Crosby Gregory, Attys.

UNITED STATES PATENT OFFICE.

WILLIAM R. TEMPLETON, OF BOSTON, MASSACHUSETTS.

VALVE.

No. 826,625.  Specification of Letters Patent.  Patented July 24, 1906.

Application filed June 16, 1905. Serial No. 265,527.

*To all whom it may concern:*

Be it known that I, WILLIAM R. TEMPLETON, a citizen of the United States, and a resident of Boston, county of Suffolk, State of Massachusetts, have invented an Improvement in Valves, of which the following description, in connection with the accompanying drawings, is a specification, like numerals on the drawings representing like parts.

This invention relates to valves for steam, water, or other fluid; and it has for its object the production of a novel valve-seat which can be removed or replaced without disturbing the valve-shell in its fixed position in steam or other connections and so constructed and arranged that the pressure of the fluid passing through the valve-seat acts to force the valve-seat tightly in place and maintain it tight.

Removable valve-seats have been heretofore devised, usually in the nature of a ring or collar which is externally threaded to screw into an internally-threaded valve port or opening within the valve-shell; but considerable difficulty has been experienced in keeping the valve-seat tight in its place.

The variations of temperature of the valve-seat and the part on which it is mounted tend to loosen the seat and permit leakage around the valve-seat, so that the valve as a whole is not as efficient as it should be.

In accordance with my present invention I have provided simple and effective means whereby the pressure of the fluid passing through the valve-seat when open causes said valve-seat to tighten automatically on its support and remain tight under all conditions of use.

The novel features of my invention will be fully described in the subjoined specification and particularly pointed out in the following claims.

Figure 1:
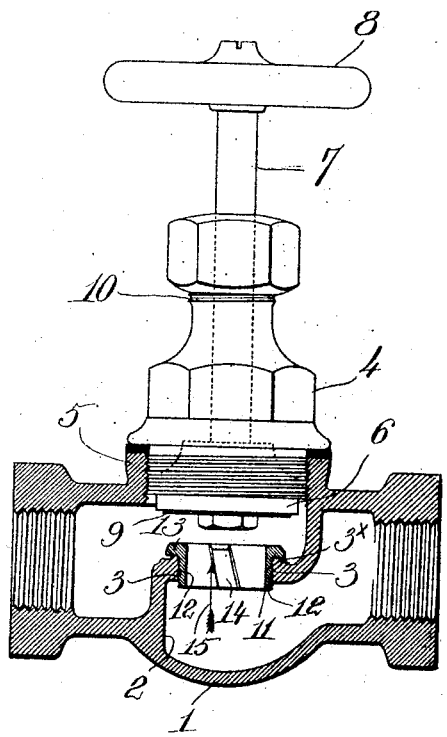
Figure 2:
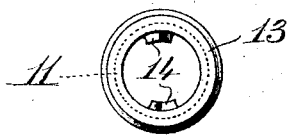

Figure 1 is a view of an ordinary globe-valve embodying my invention, the valve-shell and valve-seat being shown in section and the bonnet and valve in elevation, the valve being raised to avoid confusing the drawing; and Fig. 2 is a top plan view of my improved valve-seat detached.

The valve-shell 1 of ordinary construction is provided with the usual wall 2 between the inlet and outlet ports of the shell, and the valve port or opening is internally threaded at 3 for the removable valve-seat.

The bonnet 4, threaded to engage the threaded nipple 5 of the shell, the valve 6, valve-spindle 7, and hand-wheel 8 attached thereto, and the preferably non-metallic facing 9 of the valve may be and are all of well-known construction, the spindle 7 being rotatable and longitudinally movable in the gland 10, as usual, to open or close the valve.

In accordance with my invention the removable valve-seat is made as a ring or collar 11, externally threaded at 12, Fig. 1, to screw into the threaded port at 3, the upper end of the ring having a laterally-enlarged annular flange 13, which projects over and rests upon the circular lip $3^\times$ of the port, said flange forming the valve-seat proper.

Upon the interior of the valve-seat I form one or more diagonal ribs or projections 14, (clearly shown in the drawings,) and preferably a plurality of such ribs are employed, two being shown in Fig. 2; but the number of such ribs is immaterial.

The ribs are so inclined with relation to the thread on the valve-seat that pressure upon the ribs in the direction of arrow 15, Fig. 1, will tend to rotate the valve-seat in a direction to set up or tighten the same in the port, the greater the pressure of the fluid passing through the valve-seat the greater the power with which it is tightened and maintained tight.

No packing is required to prevent leakage around the valve-seat, and even should there be a loosening of the same in the port when the valve cools down the first action of any fluid passing through when the valve is open will be to tighten the valve-seat automatically.

The removable seat can be inserted and screwed up by the fingers, if desired, as the tightening will thereafter be completed by the fluid-pressure; but the ribs also afford a hold for a flat metal tool if it be desired to set up the seat by hand and also facilitate its removal if hot or if it should become very tightly held in the port.

My invention is not restricted to the particular form of valve herein shown nor to the precise details of construction herein shown, for the same may be modified in different particulars without departing from the spirit and scope of my invention.

Having fully described my invention, what I claim as new, and desire to secure by Letters Patent, is—

1. The combination, with a valve-shell having a threaded valve port or opening, of an annular, externally-threaded valve-seat adapted to be screwed into said port, and means on the valve-seat to automatically tighten it in the port by the action of fluid passing therethrough.

2. The combination, with a valve-shell having a threaded valve port or opening, of an annular, externally-threaded valve-seat adapted to be screwed into said port, and means tending to rotate and tighten the valve-seat in the port by the action of fluid passing therethrough.

3. The combination, with a valve-shell, of an annular valve-seat removably mounted therein, and means on the interior of the valve-seat to retain the same in place by the pressure of fluid passing therethrough.

4. The combination, with a valve-shell having a threaded valve port or opening, of an annular, externally-threaded valve-seat adapted to be screwed into said port, and a diagonal rib on the interior of the valve-seat, to be acted upon by the fluid passing through said seat and acting to tighten the same in the port.

5. The combination, with a valve-shell having a threaded valve port or opening, of an annular externally-threaded valve-seat adapted to be screwed into said port, and a plurality of diagonal ribs on the interior of the valve-seat and inclined with relation to its external thread to cause setting up rotation of the valve-seat in the port by the action of the fluid on the ribs.

6. A valve-shell having an internally-threaded valve port or opening, a removable ring or collar externally threaded to screw into the port and having a laterally-projecting annular flange forming a valve-seat, and diagonal ribs or projections on the interior of the ring or collar, as and for the purpose set forth.

In testimony whereof I have signed my name to this specification in the presence of two subscribing witnesses.

WILLIAM R. TEMPLETON.

Witnesses:
 JOHN C. EDWARDS,
 ELIZABETH R. MORRISON.